United States Patent [19]

Reitmeier et al.

[11] Patent Number: 4,621,287

[45] Date of Patent: Nov. 4, 1986

[54] TIME-MULTIPLEXING OF AN INTERLEAVED SPECTRUM OF A TELEVISION SIGNAL

[75] Inventors: Glenn A. Reitmeier, Trenton; Curtis R. Carlson, Princeton, both of N.J.

[73] Assignee: RCA Corporation, Princeton, N.J.

[21] Appl. No.: 615,091

[22] Filed: May 29, 1984

[51] Int. Cl.[4] ............................................. H04N 7/08
[52] U.S. Cl. ..................................... 358/141; 358/146
[58] Field of Search ................... 358/12, 13, 141, 142, 358/146

[56] References Cited

U.S. PATENT DOCUMENTS

| | | | |
|---|---|---|---|
| 2,686,831 | 8/1954 | Dome | 358/12 |
| 2,716,151 | 8/1955 | Smith | 358/12 |
| 3,793,478 | 2/1974 | Verhoeven | 358/12 |
| 3,871,019 | 3/1975 | Bingham | 358/12 |
| 3,872,498 | 3/1975 | Pritchard | 358/30 |
| 4,485,401 | 11/1984 | Tan et al. | 358/12 |

FOREIGN PATENT DOCUMENTS 57826  8/1982  European Pat. Off. .

OTHER PUBLICATIONS

Journal, SMPTE, Oct. 1984, "Experiments on Proposed Extended-Definition TV with Full NTSC Compatibility", By T. Fukinuki, et al, pp. 923-929.

Primary Examiner—John W. Shepperd
Attorney, Agent, or Firm—Eugene M. Whitacre; Paul J. Rasmussen; Joseph J. Laks

[57] ABSTRACT

High horizontal spatial frequency information may be transmitted through a limited bandwidth channel by means of spatial-temporal frequency interleaving techniques. To transmit both frequency interleaved high horizontal spatial frequency information and diagonal spatial frequency information in one video signal, the corresponding spectra containing these two types of information are time-multiplexed prior to transmission. At the receiver, the interleaved high horizontal frequency information is extracted, relocated to its original horizontal position, and recombined with the diagonal frequency information to generate a baseband video signal.

14 Claims, 8 Drawing Figures

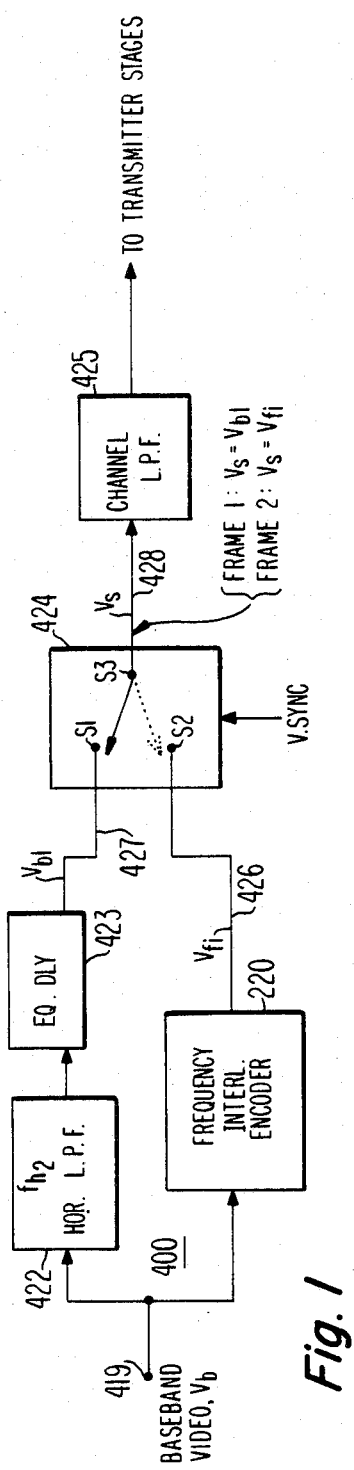
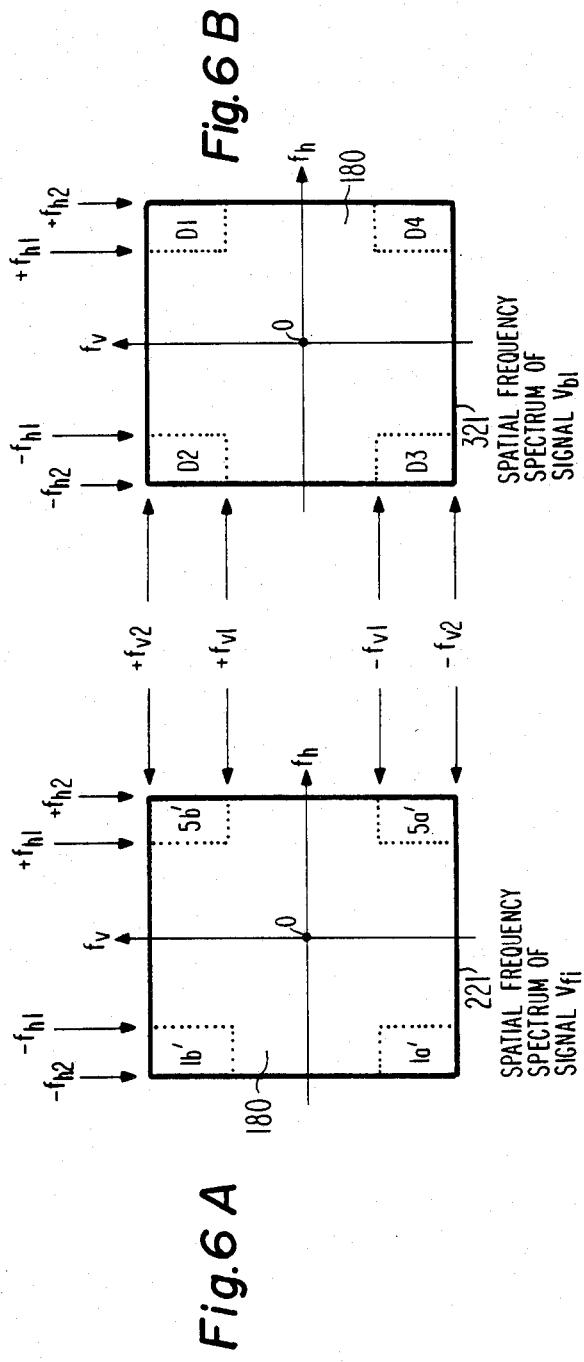

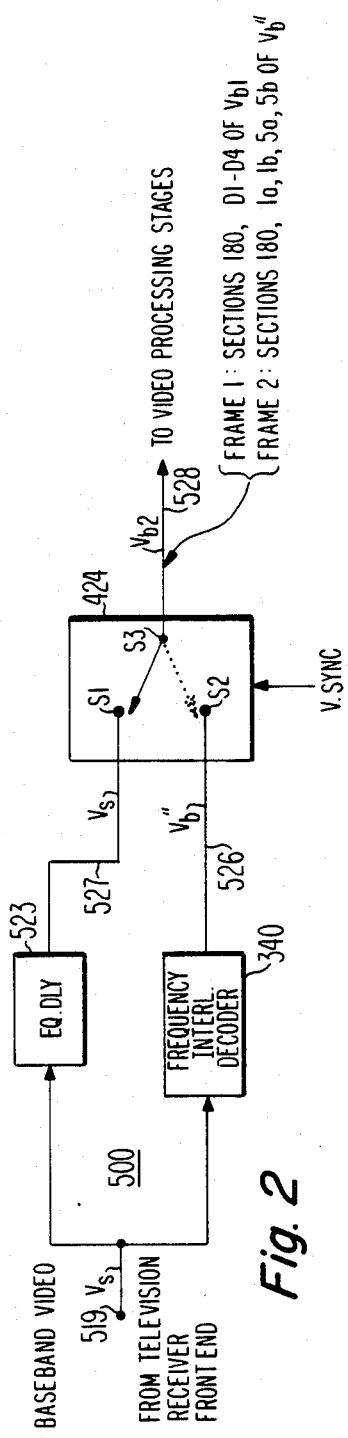
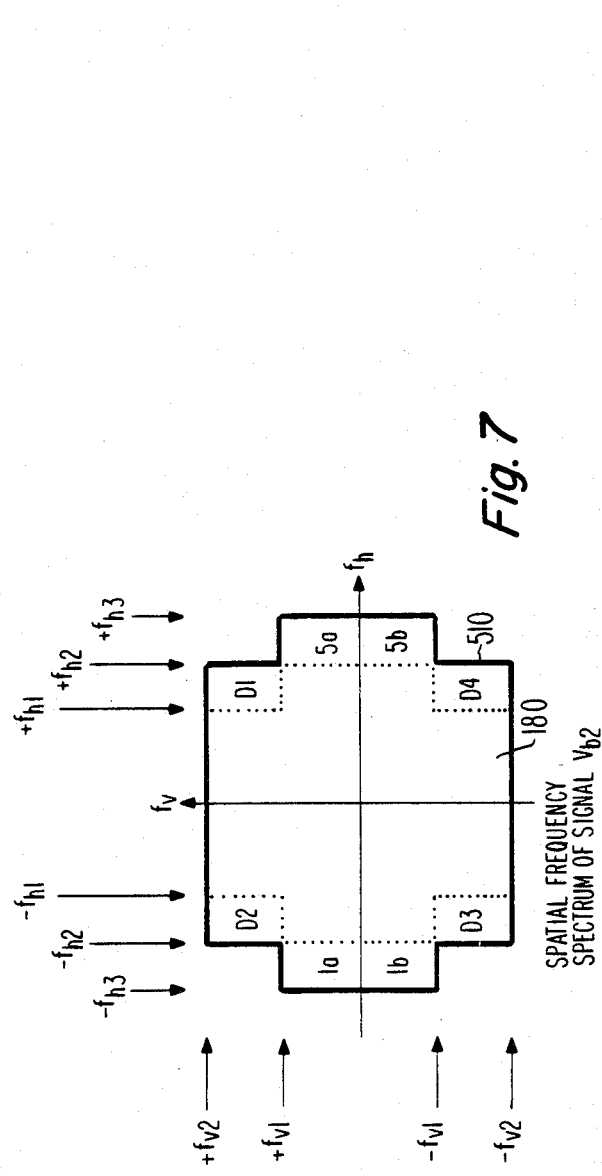

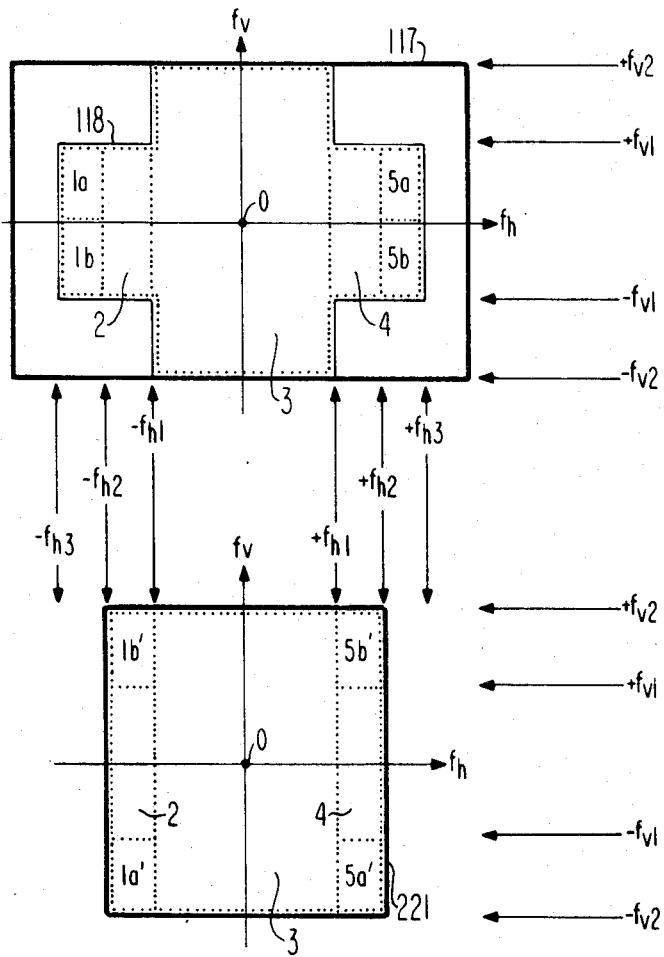

TIME-MULTIPLEXING OF AN INTERLEAVED SPECTRUM OF A TELEVISION SIGNAL

This invention relates to spatial-temporal frequency interleaving of a video signal.

A desirable objective of high definition television is a picture that is sharper and more pleasing than is provided by broadcast and television receiver equipment presently in general use. Some of the features proposed for a high definition television system include the following: increasing the line rate over the conventional 525 or 625 lines per frame to 1,050 or 1,250 lines per frame, extending the aspect ratio from a conventional 4:3 aspect ratio to an aspect ratio such as 5:3, and increasing the effective resolution of the picture.

A high definition television system that attempts to provide most or all of these features has heretofore required either a substantial increase in bandwidth of the transmission channel or a substantial compromise in the specifications for one or more of the features described above. Spatial-temporal frequency interleaving techniques are described in U.S. patent application Ser. No. 615,093, entitled SPATIAL-TEMPORAL FREQUENCY INTERLEAVING OF THE SPECTRUM OF A TELEVISION SIGNAL BY MEANS OF RECTANGULARLY SHAPED INTERLEAVED SECTIONS, filed concurrently herewith, by C. H. Strolle et al., and are described in U.S. patent application Ser. No. 615,092, entitled, SPATIAL-TEMPORAL FREQUENCY INTERLEAVED PROCESSING OF A TELEVISION SIGNAL, filed concurrently herewith, by G. A. Reitmeier et al., both applications herein incorporated by reference. These techniques may be used to rearrange the spatial-temporal frequency spectrum of the image in such a way as to reduce the channel bandwidth requirement for transmission of the image without substantially reducing the desired information content of the image.

The concept of frequency interleaving involves the separation of the high spatial or temporal frequency information of an image and modulating this information on a carrier which interleaves the high frequency information with the low frequency information of the baseband spectrum. An advantage of interleaving high frequency information is that since the eye is relatively insensitive to distortion at high spatial frequencies, artifacts introduced by the interleaving will, in general, not be objectionable.

When the high definition television signal processing system incorporates sampling techniques, high frequency carriers are inherently introduced by means of the sampling procedure in the form of spectral repeat centers. When analog processing circuitry is used, spatial repeat spectra may be introduced by modulating an appropriately selected carrier wave with the video signal.

Great flexibility is available in selecting carriers that generate repeat centers at particular points in the spatial-temporal frequency volume. The effect of using carrier generation is to reconfigure the spectrum of the image, transmitting a portion of the baseband spectrum in a different location of the spatial-temporal frequency volume.

In general, spatial-temporal frequency interleaving techniques substitute one piece of spatial information, such as information contained in the high horizontal frequencies, in place of another piece of information, such as information contained in diagonal frequencies, both of which are relatively high frequency spatial information.

In accordance with an aspect of the invention, different pieces of spatial information, such as diagonal and high horizontal frequency information, are transmitted to the receiver by alternating or temporally multiplexing transmission of the pieces of information at a given rate such as at the frame rate. Thus, the video signal of an image containing diagonal frequency information is transmitted in one frame, while the video signal of an image containing high horizontal frequency information is transmitted in the alternate frame. Assuming a frame rate of 30 Hertz, the visual artifacts introduced into such a transmission system is a half-frame rate, 15 Hertz flicker.

FIG. 1 illustrates a time-multiplexing, spatial-temporal frequency interleaving encoder embodying the invention;

FIG. 2 illustrates a time-multiplexing, spatial-temporal frequency interleaving decoder embodying the invention;

FIGS. 5-8 illustrate spatial frequency spectra at various points in the frequency interleaving and reconstructing processes.

Figure 3:
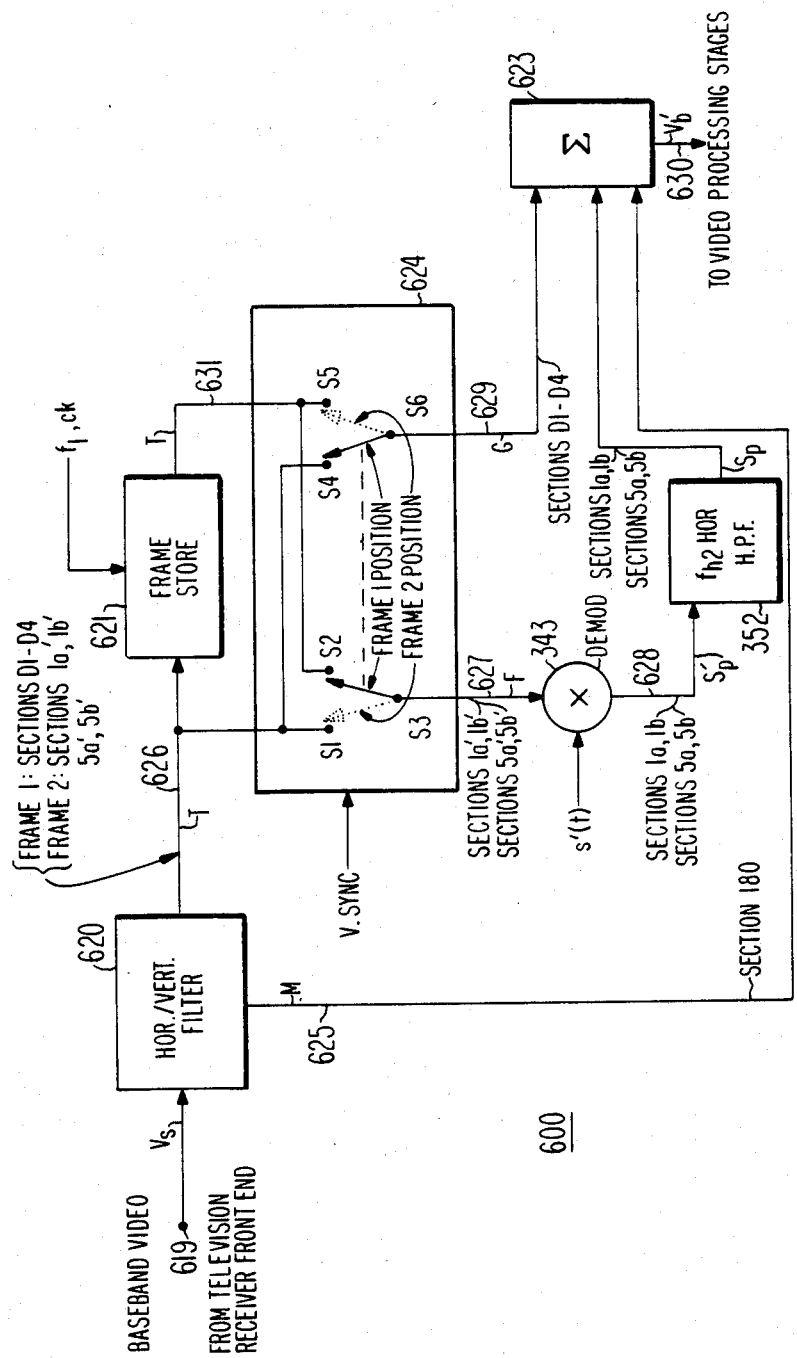
FIG. 3 illustrates another embodiment of a time-multiplexing, spatial-temporal frequency interleaving decoder in accordance with an aspect of the invention.

In video signal generator 400 of FIG. 1, embodying the invention, a baseband video signal $V_b$ is developed by conventional camera and studio equipment at a terminal 419. Video signal $V_b$ may comprise a two-to-one interlaced luminance signal component, by way of example, in a time division multiplexed component format, such as a conventional multiplexed analog component or MAC format, prior to compression.

The spatial-temporal frequency spectrum of video signal $V_b$ may be considered for explanatory purposes as arbitrarily encompassing the rectangular area 117 of FIG. 5A that includes a cruciform region 118. Not illustrated in any of FIG. 5 through FIG. 8 are repeat spectra having repeat centers located on the vertical axis $f_v$. These repeat spectra are inherently generated in the scanning process. However, this process when performed in the camera and in the television receiver results in these spectra becoming attenuated.

The spectral contents of interest contained in video signal $V_b$ are those encompassed within cruciform region 118, including high horizontal spatial frequency sections 1a, 2a, 5a, 5b. Asssume, however, that the channel utilized to transmit video signals to a receiver, such as an RF broadcast channel, is of limited capacity and is not capable of transmitting video signals having horizontal spatial frequencies greater in magnitude than $f_{h2}$ of FIG. 5A. Video signal generator 400 of FIG. 1 may use a frequency interleaving encoder 220 to reconfigure the spatial spectrum of video signal $V_b$ into spectrum 221 of FIG. 5B. The high horizontal sections 1a, 1b, 5a, 5b of spectrum 118 of FIG. 5A have been positioned next to the corners of the cruciform spectrum to respectively form the complementary sections 1a', 1b', 5a', 5b' of rectangular spectrum 221 of FIG. 5B. Rectangular spectrum 221 contains horizontal spatial frequencies of magnitude no greater than the aforementioned frequency $f_{h2}$.

To accomplish the spectral reconfiguration, video signal $V_b$, a frequency interleaving encoder 220 may be similar to the one described in the aforementioned U.S. patent application of Strolle et al. Encoder 220 produces a frequency interleaved video signal $V_{fi}$ on a signal line 426. The spatial frequency spectrum of video signal $V_{fi}$ is the previously described rectangular spectrum 221, illustrated in FIG. 5B, and again illustrated in FIG. 6A. The signal $V_{fi}$ includes high horizontal spatial frequencies, moved or interleaved into the corners of spectrum 221 as sections $1a'$, $1b'$, $5a'$, $5b'$. Video signal $V_{fi}$ therefore does not contain any diagonal information.

Baseband video signal $V_b$ is also coupled to a horizontal low pass filter 422 which remove from the video signal spatial frequencies that extend beyond $\pm f_{h2}$. After suitable delay in a delay unit 423, a filtered video signal $V_{b1}$ is developed on a signal line 427 having the spatial frequency spectrum 321 illustrated in FIG. 6B. The spectrum of video signal $V_{b1}$ includes diagonal spatial frequencies D1 through D4 located in the same corners as those in which the high horizontal spatial frequencies are located for the frequency interleaved signal $V_{fi}$. Comparing FIG. 6B with FIG. 6A, one notes that both signals have a common spectral section 180. Where the spectral content of the two signals differs is in the corners where signal $V_{b1}$ favors diagonal spatial frequencies, and signal $V_{fi}$ favors high horizontal spatial frequencies.

Video signal $V_{b1}$ is coupled to a contact S1 of a single-pole-double-throw switch 424. Video signal $V_{fi}$ is coupled to a contact S2. A vertical sync signal, conventionally derived, is coupled to switch 424 to enable the arm of the switch to move between contacts S1 and S2 at a frame rate. During Frame 1, for example, video signal $V_{b1}$ is coupled to pole S3 of switch 424, and during Frame 2, the alternate frame, video signal $V_{fi}$ is coupled to pole S3. Video signal $V_s$ developed on a signal line 428 is a luminance signal that comprises video signal $V_{b1}$ during Frame 1 and video signal $V_{fi}$ during the alternate frame, Frame 2. The spatial frequency spectrum of video signal $V_s$, therefore, alternates between that of spectrum 321 of FIG. 6B during Frame 1 and that of spectrum 221 of FIG. 6A during Frame 2.

Video signal $V_s$, after being filtered by a channel low pass filter 425, is then sent to conventional transmitter stages, such as the RF modulating stages in a broadcast transmission system. Not illustrated in FIG. 1 are the additional, conventional stages of MAC processing that compresses the luminance signal and combines it with the compressed chrominance signal, the reference burst or other timing signal and the pulse code modulated portion to obtain a MAC formatted signal.

FIG. 2 illustrates a video signal processor 500 in a television receiver that takes the baseband, temporally multiplexed video signal $V_s$ and generates an extended spatial frequency video signal $V_{b2}$ that contains both diagonal spatial frequency information and high horizontal spatial frequency information, but not in the same frame.

After the transmitted video signal has been received by the television receiver and processed by the front end stages, such as the tuner and the IF stages, assuming transmission by way of an RF modulated broadcast carrier, and has been demultiplexed and decompressed in a MAC processor, the temporally multiplexed, baseband video signal $V_s$ representing the luminance component of a MAC signal is developed at a terminal 519 of FIG. 2.

In FIG. 2, video signal $V_s$ is coupled to a frequency interleaved decoder 340, such as described in the aforementioned U.S. patent application of Strolle et al. to develop a video signal $V''_b$ on a signal line 526. The spatial frequency spectrum of video signal $V''_b$ during alternate frames corresponding to the aforementioned Frame 2 is the reconstructed spatial frequency spectrum 118, illustrated in FIG. 5A.

Video signal $V''_b$ is coupled to contact S2 of switch 424 and video signal $V_s$ is coupled to contact S1 via a delay 523 along a signal line 527. Switch 424 of FIG. 2 is constructed and operated identically to switch 424 of FIG. 1. During Frame 1, therefore, the arm of switch 424 is coupled to contact S1 and passes through video signal $V_s$ to pole S3. During Frame 1, video signal $V_s$ comprises the aforementioned video signal $V_{b1}$ of FIG. 18 that contains diagonal spatial frequencies D1 through D4.

Video signal $V_{b2}$ developed on signal line 528 comprises, during Frame 1, video signal $V_{b1}$. During Frame 2, the arm of switch 424 is coupled to contact S2, to pass through video signal $V''_b$ to signal line 528. During Frame 2, therefore, video signal $V_{b2}$ comprises reconstructed video signal $V''_b$.

Video signal $V_{b2}$ comprises a luminance signal that contains the spatial frequency spectrum 510 illustrated in FIG. 7. Spatial frequency spectrum 510 comprises center section 180 that is common to both reconstructed video signal $V''_b$ and video signal $V_{b1}$. During Frame 1, spectrum 510 includes diagonal frequency sections D1 through D4 but not high horizontal frequency sections $1a$, $1b$, $5a$, $5b$. During Frame 2, spectrum 510 includes high horizontal frequency sections $1a$, $1b$, $5a$, $5b$, but not diagonal frequency sections D1 through D4.

The luminance video signal $V_{b2}$ and the chrominance signal components generated by the MAC processor, not illustrated in FIG. 2, are matrixed and supplied to the picture tube driver stage of the television receiver for display of the high definition picture content contained in these signals. Although the frequency interleaving techniques have been described by way of example for the luminance signal component of a MAC signal, similar frequency interleaving techniques may be used to extend the spatial frequencies in the chrominance signal components and in other signal formats.

When using video processor 500 of FIG. 2 to obtain video signal $V_{b2}$, containing spatial frequency spectrum 510 of FIG. 7, a 15 Hertz flicker is introduced into the diagonal spatial frequency content of the displayed picture and into the high horizontal spatial frequency content. Video processor 600 of FIG. 3 illustrates another embodiment of the invention that produces an extended spatial frequency video signal $V'_{b2}$ from the video signal $V_s$ such that $V'_{b2}$ has the same spatial frequency spectrum 510 but does not have a 15 Hertz flicker.

In FIG. 3, the temporally multiplexed video signal $V_s$ developed at a terminal 619 is coupled to a horizontal and vertical filter 620 that separates the high spatial frequencies of the signal $V_s$ from the low spatial frequencies. On an output line 625, a signal M is developed having a spatial frequency content that comprises common section 180 of the spectrum of the signals $V_{fi}$ and $V_{b1}$ of FIGS. 6A and 6B. On an output line 626, a signal T is developed that contains the high spatial frequency content of the signal $V_s$. During Frame 1 signal T contains the diagonal spatial frequencies of sections D1 through D4 of FIG. 6B, and during Frame 2 signal T contains the high horizontal spatial frequencies of section $1a'$, $1b'$, $5a'$, $5b'$ of FIG. 6A.

Signal T is coupled to a frame store 621 to produce a frame delayed output on a signal line 631 that provides access in two adjacent frames to diagonal sections D1 through D4 and frequency interleaved high horizontal sections $1a'$, $1b'$, $5a'$, $5b'$.

Frame store 621 is clocked at a frequency $f_1$ by the clock signal $f_1$,ck. The sampling frequency $f_1$ and the pixel capacity of frame store 621 is such as to provide full resolution out to horizontal spatial frequencies $\pm f_{h2}$ and vertical spatial frequencies $\pm f_{v2}$.

The undelayed signal T developed on signal line 626 and the frame delayed signal T developed on signal line 631 are coupled to a double-pole-double-throw switch 624. The two arms of switch 24 are ganged so as to simultaneously switch between their respective contact terminals at a frame rate. During Frame 1, for example, the arm of pole S3 makes contact with terminal S2 and the arm of pole S6 makes contact with terminal S4. During the alternate frame, Frame 2, the arm of pole S3 makes contact with terminal S1 and the arm of pole S6 makes contact with terminal S5. Signal line 626 is coupled to terminals S1 and S4, and signal line 631 is coupled to terminals S2 and S5.

During operation, switch 624 temporally demultiplexes the diagonal frequency sections D1 through D4 of signal T from the interleaved high horizontal frequency sections $1a'$, $1b'$, $5a'$, $5b'$ to develop a signal F on a line 627 coupled to pole S3 and a signal G on a line 629 coupled to pole S6. Signal F contains only the interleaved high horizontal frequency sections $1a'$, $2b'$, $5a'$, $5b'$ during Frame 2, when these sections appear in input video signal $V_s$, and, due to operation of the frame store, also during Frame 1 when diagonal sections D1 through D4 appear in video signal $V_s$. Similarly, signal G contains only the diagonal frequency sections D1 through D4 during Frame 1 when these sections appear in input video signal $V_s$ and, due to operation of the frame store, also during Frame 2 when the interleaved high horizontal frequency sections appear in video signal $V_s$.

Signal F is coupled to a modulator 343. A carrier wave signal $s'(t)$ is also coupled to modulator 343 to produce a carrier demodulated signal $S'_P$ on a signal line 628. A high pass filter 352 removes undesired spectral sections having horizontal spatial frequencies smaller in magnitude than $f_{h2}$. As explained in the aforementioned Strolle, et al. patent application, due to the demodulation process, the spatial frequency spectrum of signal $S_P$ at the output of filter 352 is the frequency reconstructed high horizontal sections $1a$, $1b$, $5a$, $5b$ of FIG. 7. Signals M, $S_P$ and G are summed in an adder 623 to produced extended spatial frequency video signal $V'_{b2}$ on signal line 630, containing spatial frequency spectrum 510, illustrated in FIG. 7, wherein both diagonal spatial frequencies and high horizontal spatial frequencies are simultaneously contained in the video signal during any given frame.

In video signal processor 600 of FIG. 3, both the diagonal spatial frequency sections D1 through D4 and the high horizontal spatial frequency sections $1a$, $1b$, $5a$, $5b$ of FIG. 7 are simultaneously contained in extended video signal $V'_{b2}$. In contrast, video signal processor 500 of FIG. 2 produces an extended video signal $V_{b2}$ that alternately contains, on a frame-by-frame basis, the diagonal spatial frequencies and the high horizontal spatial frequencies.

Video signal processor 600 is not subject to a 15 Hertz flicker of the diagonal and high horizontal frequency information. However, because this information is repeated in both Frames 1 and 2, other artifacts may be introduced, such as misregistration of the diagonal and/or high frequency horizontal spatial frequencies on moving objects.

Figure 8:
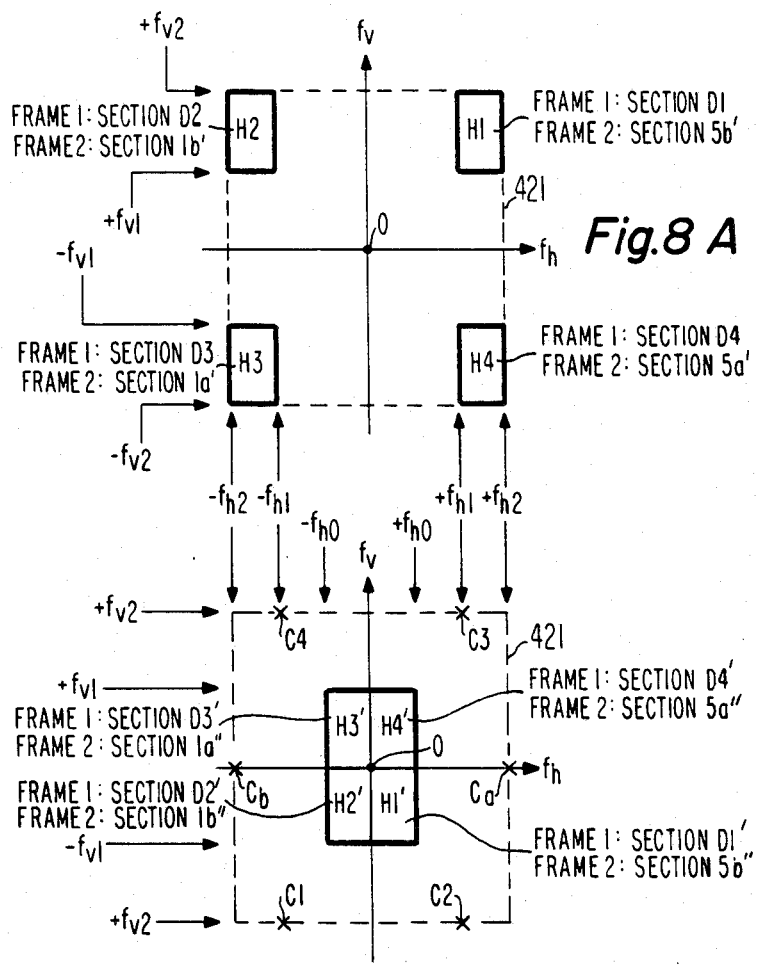

FIG. 8 illustrates the spatial frequency spectrum of signal T at the output of horizontal vertical filter 620 of FIG. 3. Sections H1 through H4 are the high spatial frequency sections that comprise either diagonal sections D1 through D4 during Frame 1 or high horizontal frequency sections $1a'$, $1b'$, $5a'$, $5b'$ during Frame 2. Sections H1 through H4 are spaced from the origin at locations corresponding to the corner locations of spectrums 221 and 321 of FIG. 6A and 6B. However, unlike spectrums 221 and 321, the spatial frequency spectrum of signal T of FIG. 8A is devoid of any information inside dashed-line rectangle 421 other than the information contained in Sections H1 through H4.

Because the range of spatial frequencies in the horizontal direction is the relatively narrow range $\Delta f_h = f_{h2} - f_{h1}$, a full resolution frame store, such as frame store 621 of FIG. 3, is not required to resolve the spatial frequencies contained in sections H1 through H4. Similarly, because vertical spatial frequencies lower than $f_{v1}$ are absent from the spectrum of signal T, frame store 621 has more line storage capacity than is needed to resolve the range of vertical spatial frequencies $\Delta f_v = f_{v2} - f_{v1}$.

Figure 4:
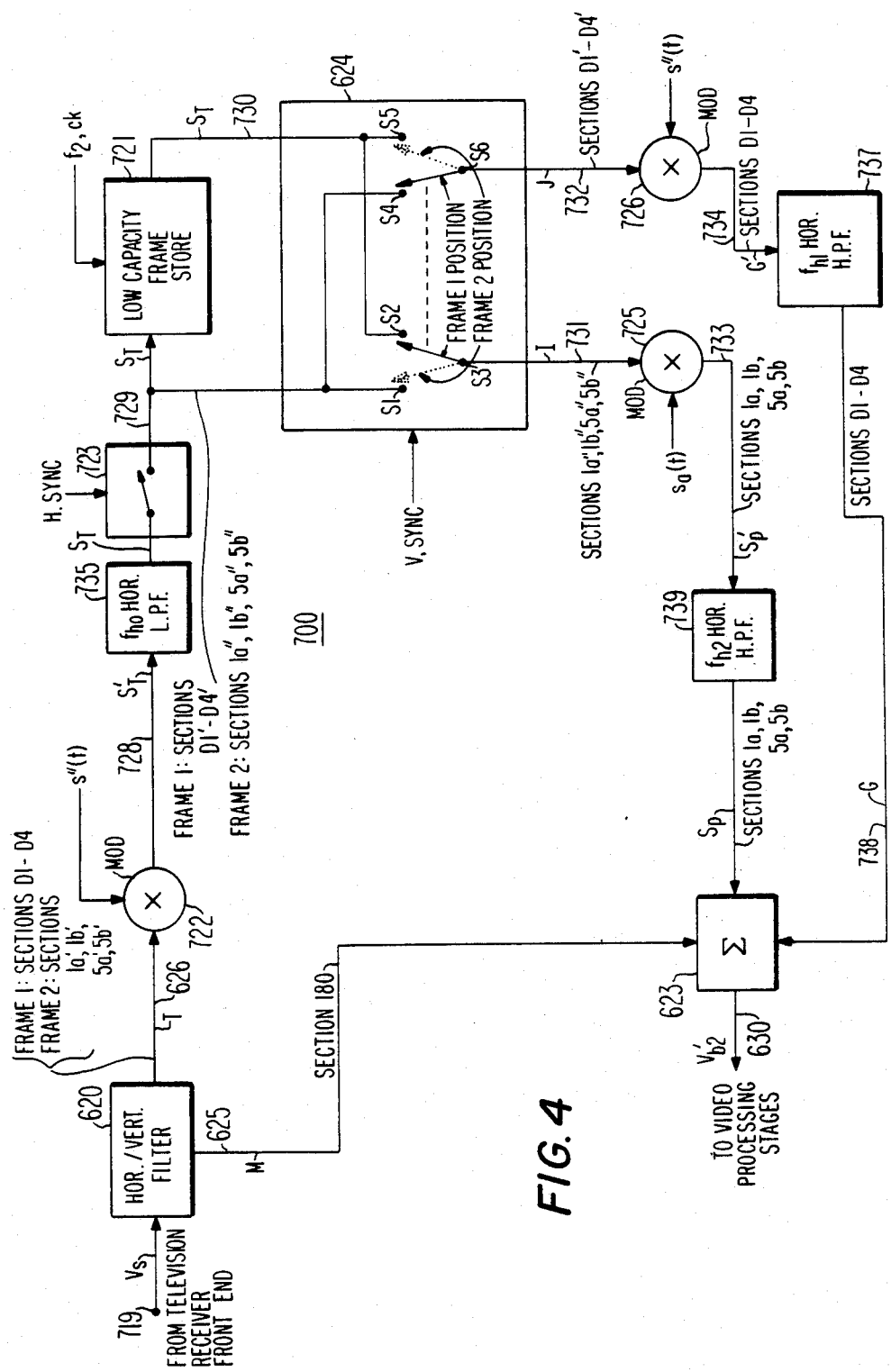
FIG. 4 illustrates still another embodiment of a time-multiplexing, spatial-temporal frequency interleaving decoder in accordance with an aspect of the invention.

In accordance with another aspect of the invention, an extended spatial frequency video signal processor 700, illustrated in FIG. 4, may be used in conjunction with a low capacity frame store 721. In FIG. 4, the temporally multiplexed video signal $V_s$, developed at terminal 719, is coupled to horizontal and vertical filter 620 for developing one line 626 signal T containing the spatial frequency spectrum illustrated in FIG. 8A and for developing on signal line 625 signal M containing the spatial frequency spectrum of section 180 of FIG. 6A and 6B.

Signal T is coupled to one input of a modulator 722. A carrier wave signal $s''(t)$ is coupled to the other input of the modulator. Modulator 722 produces an amplitude modulation of carrier signal $s''(t)$ by signal T. The amplitude modulated carrier signal $S'_T$ developed on a line 728 has the spatial frequency spectrum illustrated in FIG. 8B. Due to the modulation process, repeat centers in the spatial frequency domain are introduced that include repeat centers C1 through C4 adjacent origin O. Only repeat centers C1 through C4 are illustrated in FIG. 8B, as they are the repeat centers of importance for the purposes of this discussion. The locations of repeat centers C1 through C4 are chosen so as to move sections H1 through H4 of FIG. 8A into new positions about origin O to form corresponding spatial frequency sections H1' through H4' of FIG. 8B. A low pass filter 735 removes undesired spectral sections, not illustrated in FIG. 8B, having horizontal spatial frequencies greater in magnitude than $f_{h0}$, to develop at the filter output the amplitude modulated carrier signal $S_T$.

Because the high frequency spatial information sections H1' through H4' are grouped near origin O, a relatively low capacity frame store 721 may be used to sample signal $S_T$ that contains the relocated spectrum of FIG. 8B. The horizontal sampling rate $f_2$ of the clocking signal $f_2$,ck for frame store 721 is of a lower frequency than the corresponding frequency $f_1$ of full resolution frame store 621 of FIG. 3.

In addition, the lower vertical spatial frequency resolution of signal $S_T$ permits one to omit entire lines of samples. To omit lines of samples, signal $S_T$ at the output of filter 735 is coupled to low capacity frame store 721 via a switch 723 controlled by horizontal sync signals. If, for example, the vertical spatial resolution contained in signal $S_T$ is half that contained in signal T, then switch 723 passes through only every other horizontal line.

Signal $S_T$ developed on line 729 at the output of switch 723 and the frame delayed signal $S_T$ developed on line 730 at the output of low capacity frame store 721 are coupled to the double-pole-double-throw switch 624 that operates identically to switch 624 previously described with respect to the circuit of FIG. 3. A signal I developed on line 731 coupled to pole S3 of switch 624 contains high horizontal spatial frequency sections $1a''$, $1b''$, $5a''$, $5b''$ of FIG. 8B. A signal J developed on line 732 coupled to pole S6 contains diagonal spatial freuqency sections $D1'$ through $D4'$ of FIG. 8B.

Signal J is coupled to one input of a modulator 726. Carrier wave signal $s''(t)$, previously referred to, is coupled to the other input of modulator 726. The modulated signal $G'$ developed on line 734 contains the reconstructed diagonal spatial frequency sections D1 through D4, located in their proper corner positions, illustrated in FIG. 7. Additional undesired low frequency spectral sections, not illustrated, are removed by a high pass filter 737 having a cutoff frequency of $f_{h1}$ to develop a signal G on a line 738 that contains only diagonal spatial frequency sections D1 through D4.

Signal I is coupled to one input of a modulator 725. A carrier wave signal $s_a(t)$ is coupled to the other input of the modulator to develop the signal $S'_p$ on a line 733. Carrier wave signal $s_a(t)$ is chosen to produce repeat spectra that have repeat centers $C_a$ and $C_b$ located on the horizontal axis $f_h$ in the positions illustrated in FIG. 8B. Only repeat centers $C_a$ and $C_b$ are illustrated in FIG. 8B, as they are the only repeat centers of importance in this discussion.

By having repeat centers $C_a$ and $C_b$ located as illustrated, sections $1a''$, $1b''$, $5a''$, $5b''$ are moved from their locations adjacent origin O to locations adjacent repeat centers $C_a$ and $C_b$. Thus, the high horizontal spatial frequency information of sections $1a$, $1b$, $5a$, $5b$ is restored to its proper location in the spatial frequency domain, at the locations illustrated in FIG. 7. To remove undesired lower frequency spectral sections, signal $S'_p$ is filtered in a high pass filter 739 having a cutoff frequency $f_{h2}$ to develop signal $S_p$ on a line 740 having only the spectral sections $1a$, $1b$, $5a$, $5b$.

Signals M, $S_p$ and G are summed in adder 623 to develop on line 630 the extended spatial frequency video signal $V'_{b2}$ having the spatial frequency spectrum 510 of FIG. 7 that includes both diagonal spatial frequency information and high horizontal spatial frequency information.

It should be understood that time-multiplexing spatial frequency spectra in accordance with the invention may be extended to multiplexing arrangements other than multiplexing, on a frame alternating basis, the spatial frequency spectrums 221 and 321 of 6A and 6B. For example, a time-multiplexing scheme may be provided that transmits diagonal spatial frequency information, high horizontal spatial frequency information and high vertical spatial frequency information. During Frame 1, for example, diagonal spatial frequency information is transmitted; during Frame 2, high horizontal spatial frequency information is transmitted; and during Frame 3, high vertical spatial frequency information is transmitted. Furthermore, the time-multiplexing may be performed on a field-by-field basis rather than a frame-by-frame basis. In each of the schemes, tradeoffs must be considered between introducing flickering artifacts, introducing spatial artifacts, and introducing motion artifacts.

The carrier modulation or equivalent digital sampling tends to introduce a full strength alias which could result in undesirable artifacts being displayed together with the picture information. U.S. patent application Ser. No. 615,094, entitled, SPATIAL-TEMPORAL FREQUENCY INTERLEAVED PROCESSING OF A TELEVISION SIGNAL WITH REDUCED STRENGTH INTERLEAVED SECTIONS, filed concurrently herewith, by G. A. Reitmeier et al., herein incorporated by reference, describes a method by which the effects of aliasing are substantially reduced.

What is claimed is:

1. Apparatus for generating a video signal containing a time-multiplexed spatial-temporal frequency spectrum, comprising:
    means for receiving a first video signal containing an image having associated therewith an image spectrum in a spatial-temporal frequency volume;
    means responsive to said first video signal for generating a second video signal that contains a first portion of said image spectrum;
    means responsive to said first video signal for generating a third video signal that contains a spectrum having a spatial-temporal interleaved section derived from a corresponding section of said image spectrum; and
    means responsive to said second and third video signals for generating a fourth video signal that contains a spectrum that is time-multiplexed between said first portion of said image spectrum and said spatial-temporal interleaved section,
    wherein said interleaved section is generally of rectangular shape located in a corner of the spectrum of the fourth video signal and is derived from a corresponding section of said image spectrum that contains horizontal spatial frequencies that are all high frequencies greater than a first, horizontal frequency and that contains vertical spatial frequencies that are all low frequencies lower than a second, vertical frequency and wherein said first portion of said image spectrum is positioned in the location of said interleaved section and is of rectangular shape, containing only diagonal spatial frequencies of horizontal frequency lower than said first, horizontal frequency, and of vertical frequency higher than said second, vertical frequency, said fourth video signal further containing a second spatial frequency spectrum of nonoverlapping spatial frequencies that complement said diagonal frequencies and that are present in said fourth video signal when said first portion is present therein and also when said interleaved section is present therein.

2. Apparatus according to claim 1 wherein the spectrum of said third video signal is generally of rectangular shape, with said interleaved section being located in a corner of the spectrum.

3. Apparatus for processing a video signal that contains a time-mulitplexed spectrum, comprising:

means for receiving a first video signal that contains a spatial-temporal frequency spectrum comprising a first portion of a spectrum of an image that is time-multiplexed with a spatial-temporal interleaved spectral section of rectangular shape derived from a corresponding section of the image spectrum that contains horizontal spatial frequencies that are all high frequencies greater than a first, horizontal frequency, and that contains vertical spatial frequencies that are all low frequencies lower than a second, vertical frequency, said first portion being of generally rectangular shape that contains only diagonal spatial frequencies of horizontal frequency lower than said first horizontal frequency and of vertical frequency higher than said second, vertical frequency, the spectrum of said first video signal further containing a second spatial frequency spectrum of nonoverlapping spatial frequencies that complement said diagnonal frequencies and that are present in said first video signal when said first portion is present therein and also when said interleaved section is present therein;

means responsive to said first video signal for generating a second video signal that contains a reconstructed spectrum, with said interleaved section being repositioned to the location in the image spectrum occupied by said corresponding section of said image spectrum; and means responsive to said first and second video signals for generating a third video signal that contains a spectrum that includes both said reconstructed spectrum and said first portion of said image spectrum.

4. Apparatus according to claim 3 including means responsive to said first video signal for generating a fourth video signal that contains a common spectral section occupying the region of said second spatial frequency spectrum and wherein said third video signal generating means is responsive to said fourth video signal for including into the spectrum of said third video signal said common spectral section.

5. Apparatus according to claim 3 including a delay element responsive to said first video signal and providing sufficient delay time for generating at an output signal line thereof a delayed video signal containing one of the time-multiplexed spectra when the video signal at an input signal line thereof contains the other of the time-multiplexed spectra, and including switching means coupled to said delay element and to said second and third video signal generating means to enable the spectrum of said third video signal to simultaneously include said reconstructed spectrum and said first portion of said image spectrum.

6. Apparatus according to claim 5 including means for producing a fourth video signal on the input signal line of said delay element that represent carrier modulation of said first portion of said image spectrum and of said interleaved spectral section to position said first portion of said image spectrum and said interleaved spectral section to frequencies lower than said diagonal frequencies.

7. Apparatus according to claim 6 wherein said third video signal generating means comprises means responsive to the output of said switching means for producing fifth and sixth video signals that respectively represents further carrier modulation of the carrier modulated first portion of said image spectrum and of the carrier modulated interleaved spectral section such that said fifth signal contains said reconstructed spectrum and said sixth signal contains said first portion of said image spectrum restored to its original location in the image spectrum, and including means responsive to said fifth and sixth signals for developing said third signal therefrom.

8. Apparatus according to claim 5 including means responsive to said first video signal for generating a fourth video signal that contains a common spectral section occupying the region of said second spatial frequency spectrum and wherein said third video signal generating means is responsive to said fourth video signal for including into the spectrum of said third video signal said common spectral section.

9. Apparatus for processing a video signal that contains a time-multiplexed spectrum, comprising:

means for receiving a first video signal that contains a first spatial-temporal frequency spectrum in at least first and second dimensions that contains the image content of an image spectrum, said first spectrum including a first section representative of a first portion of said image spectrum and a time-multiplexed spatial-temporal frequency interleaved second section representative of a second portion of said image spectrum that is time-multiplexed in said first video signal with said first portion, one of said first and second sections comprising a high frequency section that contains high spectral frequencies in said first dimension;

first modulation means responsive to said first video signal for generating a second video signal that contains a modulated spectral section that is representative of the image content of said high frequency section and that is located in a low frequency spatial-temporal region that has spectral frequencies in said one dimensions that are lower than said high spectral frequencies;

a delay element coupled to said first modulation means for storing said modulated signal to generate a delayed video signal that contains the image content of said high frequency section;

a time-demultiplexer responsive to said delayed video signal and to said first video signal for time-demultiplexing said first and second portions of said image spectrum;

means including second modulation means responsive to said delayed video for generating a second modulated spectral section representative of the image content of said high frequency section restored to its corresponding location in said image spectrum; and means coupled to said time-demultiplexer and coupled to said second modulation means for generating a reconstructed spectrum inclusive of said first and second portions, with the two portions being time-demultiplexed from each other.

10. Apparatus according to claim 9 wherein said second modulation means includes a first modulator for generating a first component of said second modulated spectral section that is representative of the image content of the first portion of said image spectrum properly repositioned therein and includes a second modulator for generating a second component of said second modulated spectral section that is representative of the image content of the second portion of said image spectrum properly repositioned therein.

11. Apparatus according to claim 9 wherein said delay element stores sample of said modulated signal that are separated from one another in the horizontal scanning direction corresponding to said first dimension, the sampled spatial frequencies being lower than said high spectral frequencies.

12. Apparatus according to claim 11 wherein said delay element stores samples of said modulated signal that are separated from one another another in the vertical scanning direction, with the sampled spatial frequencies in the vertical scanning direction being lower than vertical spectral frequencies of said high frequency section.

13. Apparatus according to claim 12 wherein said first section is of rectangular shape containing only diagonal spatial frequencies of said image spectrum and wherein said interleaved second section is of rectangular shape located in the same spectral region as portion of said image spectrum that contains only higher horizontal and lower vertical spatial frequencies than said diagonal spatial frequencies.

14. Apparatus according to claim 13 wherein said second modulation means includes a first modulator for generating a first component of said second modulated spectral section that is representative of the image content of the first portion of said image spectrum properly repositioned therein and includes a second modulator for generating a second component of said second modulated spectral section that is representative of the image content of the second portion of said image spectrum properly repositioned therein.

* * * * *